United States Patent
Shuf et al.

(10) Patent No.: US 8,140,979 B2
(45) Date of Patent: Mar. 20, 2012

(54) SYSTEM AND METHOD FOR MANAGING COMPUTER OPERATIONS ACCORDING TO STORED USER PREFERENCES

(75) Inventors: Yefim Shuf, Ossining, NY (US); Alex Zlatsin, Yorktown Heights, NY (US); Dimitri Kanevsky, Ossining, NY (US); Genady Grabarnik, Scarsdale, NY (US)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 12/192,860

(22) Filed: Aug. 15, 2008

(65) Prior Publication Data

US 2010/0042649 A1    Feb. 18, 2010

(51) Int. Cl.
G06F 3/00 (2006.01)
G06F 3/048 (2006.01)

(52) U.S. Cl. ......... 715/751; 715/752; 715/753; 715/759

(58) Field of Classification Search .......... 715/751–759, 715/963
See application file for complete search history.

(56) References Cited

U.S. PATENT DOCUMENTS

| | | | |
|---|---|---|---|
| 7,337,210 B2 | 2/2008 | Barsness | |
| 7,363,590 B2 | 4/2008 | Kerr et al. | |
| 2006/0240877 A1* | 10/2006 | Filiba et al. | 455/567 |
| 2007/0071209 A1 | 3/2007 | Horvitz et al. | |
| 2007/0130275 A1 | 6/2007 | Maresh | |
| 2008/0002820 A1* | 1/2008 | Shtiegman et al. | 379/211.02 |
| 2008/0052741 A1 | 2/2008 | Dharmaji | |
| 2009/0083742 A1* | 3/2009 | Ramanathan | 718/102 |

OTHER PUBLICATIONS

Richard, et al. "Cascaded Generic XCX to Learn About Reminding Preferences", pp. 2923-2926.
Zhang, et al. "Personalization and Visualization on Handheld Devices", Department of Information Systems, University of Maryland, pp. 1008-1012.
Gervasio, et al., "Active Preference Learning for Personalized Calendar Scheduling Assistance", Computer Science & Engineering, University of Michigan, pp. 90-97.
Hodjat, et al., "CRUSE: A Context Reactive Natural Language Mobile Interface", iAnywhere Solutions., Aug. 2006.
Wobcke, W., Abstract: "Personal diary management with fuzzy preferences", Proceedings of the Fifth International Conference on the Practical Application of Intelligent Agent and Multi Agent Technology, 105-120, Practical Application Company, Blackpool, US, 2000, 400 pp. 23. Apr. 10, 2000.

* cited by examiner

*Primary Examiner* — Tadeese Hailu
(74) *Attorney, Agent, or Firm* — McGinn Intellectual Property Law Group, PLLC

(57) ABSTRACT

A system and method for managing computer operations according to stored user preferences is disclosed. The system includes a calendar module for scheduling an event and centrally storing the user preferences regarding the computer operations during the event, and a controller module for retrieving the user preferences centrally stored in the calendar module and centrally controlling the computer operations according to the user preferences during the event.

16 Claims, 7 Drawing Sheets

*System 100*

Calendar 101

Operations Control Menu 310

Method 400

SYSTEM AND METHOD FOR MANAGING COMPUTER OPERATIONS ACCORDING TO STORED USER PREFERENCES

BACKGROUND OF THE INVENTION

1. Field of the Invention

The present invention generally relates to a system and method for managing computer operations, and more specifically to a system and method for managing computer operations according to stored user preferences.

2. Description of the Related Art

Computers are often employed by users to manage events such as real-time collaborative activities. Examples of real-time collaborative activities commonly managing by computers are presentations, meetings, and teleconferences. These real-time collaborative activities require computers to simultaneously managing slideshows, audio teleconferences, interactive whiteboards, video displays, and other complex applications.

However, during real time collaborative activities, the computer is also managing normal computer operations in addition to managing the operations required by the real-time collaborative activities. Thus, it is highly possible that a program operating in the background of the activity but having no relationship to the activity may issue an alert interrupting the activity or begin a certain process which hinders the effective management of the activity.

Program alerts are often designed to require attention from the computer user. Such an alert would be issued on an on-screen display or over the loudspeakers of the computer and, thus, would be known by others involved in the activity. Such an alert may significantly distract and interrupt the computer user, the other groups involved, and a flow and progress of the activity.

Program processes often require a significant amount of computer resources to operate effectively. Such a process may significantly slow operation of an on-screen display being used to facilitate a collaborative activity, distort the rendering of sound with respect to the the collaborative activity, and cause distraction and interruption for the computer user, the audience, and a flow and progress of the activity.

One example of such a program is an anti-virus program. The anti-virus program can initiate an alert in the form of an operating system window, start scanning directories and files for viruses, and start displaying its status and the names of directories being scanned. These ocurrences may lead to a system being less responsive and slow and the aforementioned interruptions and distractions.

Another example of such a program is a back up software program. The back-up software program may start working and start copying files in the middle of an activity utilizing an on-screeen display. This may also lead to a system being less responsive and slow and the aforementioned interruptions and distractions.

Another example of such a program is an instant message program. The instant message program may provide a pop-up window with a message in the middle of an activity and clearly represented on an on-screen display. The contents of the message that is displayed may be either confidential or not appropriate in the given context to the given audience. This may also lead to a system being less responsive and slow and the aforementioned interruptions and distractions.

A further example of such a program is an audio alarm program. The audio alarm program may automatically activate and a window may be displayed with a reminder text and some sort of sound. The audio alarm program may also be used to indicate that a new email message has arrived into a mailbox in the same fashion. In addition, the audio alarm may indicate new software or software updates are available in the same fashion. Further examples include indication that new wireless networks have been detected or that a voice mail message has been received. This may also lead to a system being less responsive and slow and the aforementioned interruptions and distractions.

Further examples of such programs are Voice over Internet Protocol (VoIP) telephone programs or other various programs that are specifically audio enabled. The display or sound may indicate that a party is calling over VoIP in the middle of the activity. Certain communication programs may attempt to automatically initiate during an activity. Again, this may also lead to a system being less responsive and slow and the aforementioned interruptions and distractions.

The different distractions and interruptions that may occur are numerous and range from audible distractions to visual distractions and interruptions. These programs may also lead to a system being slowed down due to CPU, disk, or memory activities and subsequently interfere with other computer operations, which, in turn, can cause operations belonging to real-time collaborative activities to have a reduced effectiveness.

Some specific programs or applications allow the suppression and disablement of interruptions and processes designed to run in the background. However, this suppression or disablement can normally only be done manually by the user and on a program-by-program basis. Even then, many programs or applications still fail to provide a suppression or disablement feature.

Since programs or applications normally must be addressed on an individual basis, an attempt to perform this suppression or disablement of the interruptions and distractions shortly prior to a real-time collaborative activity can be an error prone effort. Often, it is hard to determine whether a program has actually been disabled or suppressed. In addition, enablement of all the programs with the interruptions and distractions after the activity has ended is also accomplished manually and individually. This, too, is a process which is extremely cumbersome and error prone.

In certain circumstances, two screens can be used to address the occurrence of program alerts during real-time collaborative activities, with a slide show, white board, or the like being shown on one screen and speaker notes and previously mentioned alerts being directed to a screen only visible to the operator of the activity. However, this solution fails to completely solve the problem. Program alerts often result block the view of speaker notes and change the "window focus" from the collaborative activity to the program issuing the alert. To return focus to the activity, the operator of the activity having access to the non-public display has to react quickly and dismiss the alert window. This has the tendency to cause a hesitation in the operator's behavior which causes a distraction and interruption to both operator and those involved in the activity.

It is also extremely well known that cellular phones can act as interruptions and distractions when activated by either a telephone call, a text message, or a low battery alert during any activity, including real-time collaborative activites. It is common place for those administering or actively involved in real-time collaborative activities to forget to switch their cellular phones, personal digital assistants (PDAs), or pagers to a mode designed to minimize interruption and distraction.

While some program alerts and processes cause interruptions that are unwanted and unnecessarily deplete computer resources, other program alerts and processes must be attended to immediately regardless of what activity is occurring or the computer resources that the process might deplete. For example, it is essential for the administrator of the activity to know if battery power on the display device or the computer is low in order for steps to be taken to provide a power source immediately to avoid any loss of attention from those involved in the activity. Also, certain other emergencies may rise to a level that warrants the interruption or distraction of an activity.

In attempt to control computer processes during real-time collaborative activities, a message prioritization method at a host server side has been disclosed in U.S. Patent Publication No. 2007/0150545 A1. However, that method does not provide a solution in a broad sense and is limited to messages routed through a central messaging server.

It is important to recognize the effect that an interruption or a distraction has on human behavior. It is documented that people are easily distracted and are not good at managing and moving on from distractions (http://portal.acm.org/citation.cfm?id=1121114). Also, interruptions and stress go hand in hand and prevent one from getting work done efficiently (http://www2.vhi.ie/topic/stressclass2). The effect of interruptions is not restricted to internal manifestations, as the effects of interruptions have also been determined by tracking an individual's eyes (http://www.cs.cmu.edu/~kraut/RKraut.site.files/articles/dabbish04_interruptions_team_v2.9-names.pdf).

Thus, the distractions and interruptions which occur during real-time collaborative activities are proven to greatly reduce productivity and concentration and potentially leak confidential and proprietary information. These hindrances have the ability to make a administrator or presented look unprofessional and ruin images of individuals and groups. Thus, it becomes extremely important to minimize or eliminate distractions and interruptions to the highest extent possible.

Hence, an effective and adaptive solution for managing distractions and interruptions during real-time collaborative activities, including presentations, meetings, audio presentations, and the like, is needed so that unnecessary interruptions can be avoided.

SUMMARY OF THE INVENTION

In view of the foregoing and other exemplary problems, drawbacks, and disadvantages of the conventional methods and structures, an exemplary object of the present invention is to provide a system and method for managing computer operations according to stored user preferences.

A first exemplary embodiment of the present invention includes a system for managing computer operations according to stored user preferences, including a calendar module for scheduling an event and centrally storing the user preferences regarding the computer operations during the event, and a controller module for retrieving the user preferences centrally stored in the calendar module and centrally controlling the computer operations according to the user preferences during the event.

In an exemplary aspect of the first exemplary embodiment of the present invention, the calendar module includes a scheduler module for allowing a user to one of schedule the event in the calendar module and indicate to the calendar module that the event is occurring presently.

In an exemplary aspect of the first exemplary embodiment of the present invention, the system further includes an environmental sensor module for detecting an occurrence of the event and communicating the occurrence of the event to the controller module. If the calendar module did not notify the controller module of the occurrence of the event prior to a detection of the occurrence of the event and if the calendar module includes stored user preferences applicable to an occurrence of an unscheduled event, the controller module controls the computer operations according to the user preferences applicable to the occurrence of the unscheduled event.

In an exemplary aspect of the first exemplary embodiment of the present invention, the calendar module includes stored information that is communicated to the controller module to determine whether one of the computer processes is an emergency.

In an exemplary aspect of the first exemplary embodiment of the present invention, the system further includes a user display module for use in facilitating an event. The controller module controls the computer processes such that the user preferences determine whether the computer processes use the user display module during the event.

In an exemplary aspect of the first exemplary embodiment of the present invention, the calendar module communicates to the user in order to prevent an emergency from occurring during the event.

In an exemplary aspect of the first exemplary embodiment of the present invention, the system further includes a synchronizer module for communicating with the calendar module in order to identify a time period in which a distraction is unwanted. The synchronizer module communicates with a device outside of the system to remove the distraction during the time period.

In an exemplary aspect of the first exemplary embodiment of the present invention, the system further includes a backup module for recording an event. The backup module is accessed by a participant of the event, the participant being disconnected from the event such that the backup module provides a portion of the event to the participant in which the participant was unable to participate due to being disconnected.

A second exemplary embodiment of the present invention includes a method for managing computer operations according to stored user preferences, including scheduling an event, centrally storing the user preferences regarding the computer operations during the event, retrieving the user preferences, and centrally controlling the computer operations according to the user preferences during the event.

In an exemplary aspect of the second exemplary embodiment of the present invention, a calendar performs the scheduling of the event and the centrally storing of the user preferences. A controller performs the retrieving of the user preferences and the centrally controlling of the computer operations. The calendar includes a scheduler that allows a user to one of schedule the event in the calendar and indicate to the calendar that the event is occurring presently.

In an exemplary aspect of the second exemplary embodiment of the present invention, the method further includes detecting an occurrence of the event by using an environmental sensor, communicating the occurrence of the event from the environmental sensor to the controller, and, if the calendar did not notify the controller of the occurrence of the event prior to the detecting of the occurrence and if the calendar comprises stored user preferences applicable to an occurrence of an unscheduled event, using the controller to control the computer operations according to the user preferences applicable to the occurrence of the unscheduled event.

In an exemplary aspect of the second exemplary embodiment of the present invention, the method further includes using the controller to determine whether one of the computer processes is an emergency.

In an exemplary aspect of the second exemplary embodiment of the present invention, the method further includes using a user display to facilitate the event, and using the user preferences to determine whether the computer processes use the user display during the event.

In an exemplary aspect of the second exemplary embodiment of the present invention, the method further includes communicating to the user in order to prevent an emergency from occurring during the event.

In an exemplary aspect of the second exemplary embodiment of the present invention, the method further includes synchronizing with the calendar in order to identify a time period in which a distraction is unwanted such that the distraction is removed during the time period.

In an exemplary aspect of the second exemplary embodiment of the present invention, the method further includes recording the event such that the event can be accessed by a participant of the event to provide the participant with a portion of the event in which the participant was unable to participate due to being disconnected from the event.

A third exemplary embodiment of the present invention includes a programmable storage medium tangibly embodying a program of machine-readable instructions executable by a digital processing apparatus to manage computer operations according to user preferences, including a calendar in which a user schedules an event and stores the user preferences regarding the computer operations during the event, and a controller for retrieving the user preferences centrally stored in the calendar and centrally controlling the computer operations according to the user preferences during the event.

In an exemplary aspect of the third exemplary embodiment of the present invention, the calendar includes a scheduler that allows the user to one of schedule the event in the calendar and indicate to the calendar that the event is occurring presently.

In an exemplary aspect of the third exemplary embodiment of the present invention, the programmable storage medium further includes an environmental sensor for detecting an occurrence of the event and communicating the occurrence of the event to the controller. If the calendar did not notify the controller of the occurrence of the event prior to a detection of the occurrence of the event and if the calendar includes stored user preferences applicable to an occurrence of an unscheduled event, the controller controls the computer operations according to the user preferences applicable to the occurrence of the unscheduled event.

In an exemplary aspect of the third exemplary embodiment of the present invention, the programmable storage medium further includes a recorder that records the event. The recorder is accessed by a participant of the event, the participant being disconnected from the event such that the recorder provides a portion of the event to the participant in which the participant was unable to participate due to being disconnected.

BRIEF DESCRIPTION OF THE DRAWINGS

The foregoing and other exemplary purposes, aspects and advantages will be better understood from the following detailed description of exemplary embodiments of the invention with reference to the drawings, in which.

DETAILED DESCRIPTION OF EXEMPLARY EMBODIMENTS OF THE INVENTION

Figure 1:
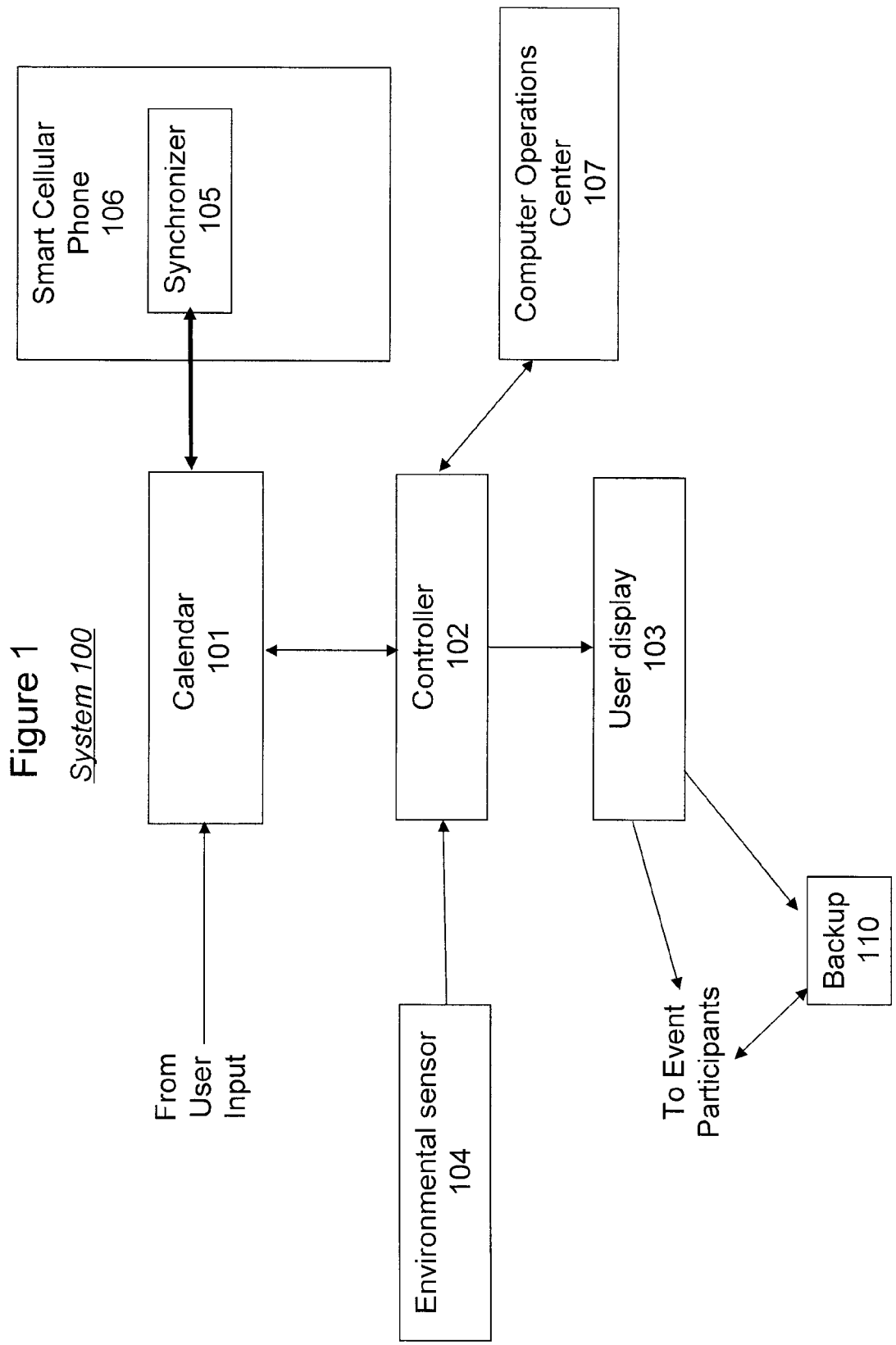
FIG. 1 illustrates an exemplary embodiment of a system of the present invention.

Referring now to the drawings, and more particularly to FIGS. 1-6, there are shown exemplary embodiments of the structures and method according to the present invention.

FIG. 1 illustrates an exemplary embodiment of a system 100 for managing a computer operation center 107 according to stored user preferences. The system 100 is able to centrally manage all computer operations of all running applications, which differs significantly from having specific applications control operations on a local level with native schedulers or task managers.

The system 100 includes a calendar 101 to which a user provides preferences and settings for central storage and a controller 102 to which the calendar communicates the user preferences and settings. The system 100 also includes a user display 103 for allowing the system 100 to communicate with a user.

Figure 3:
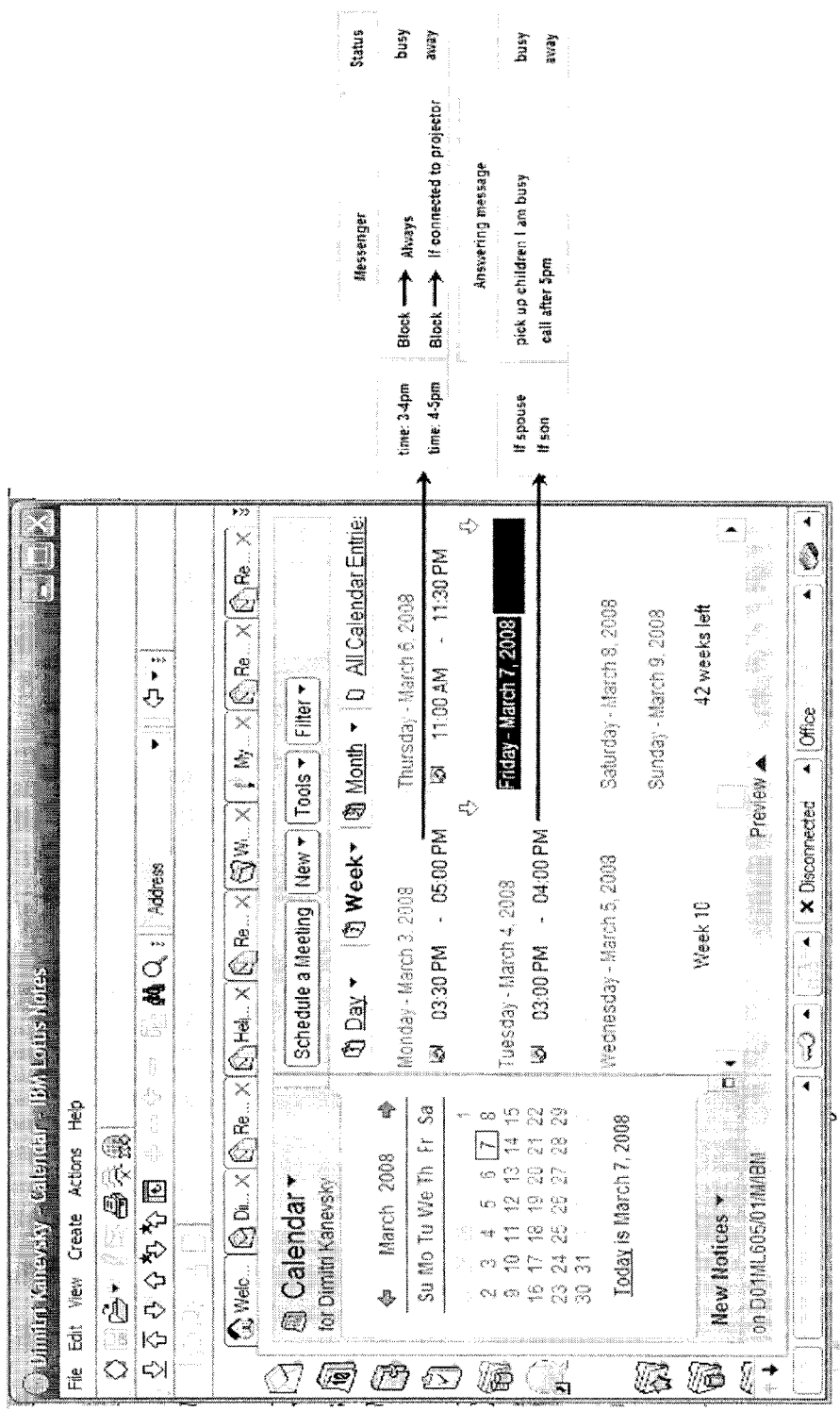
FIG. 3 illustrates an exemplary aspect of an exemplary embodiment of the calendar of the system of the present invention.
Figure 4:
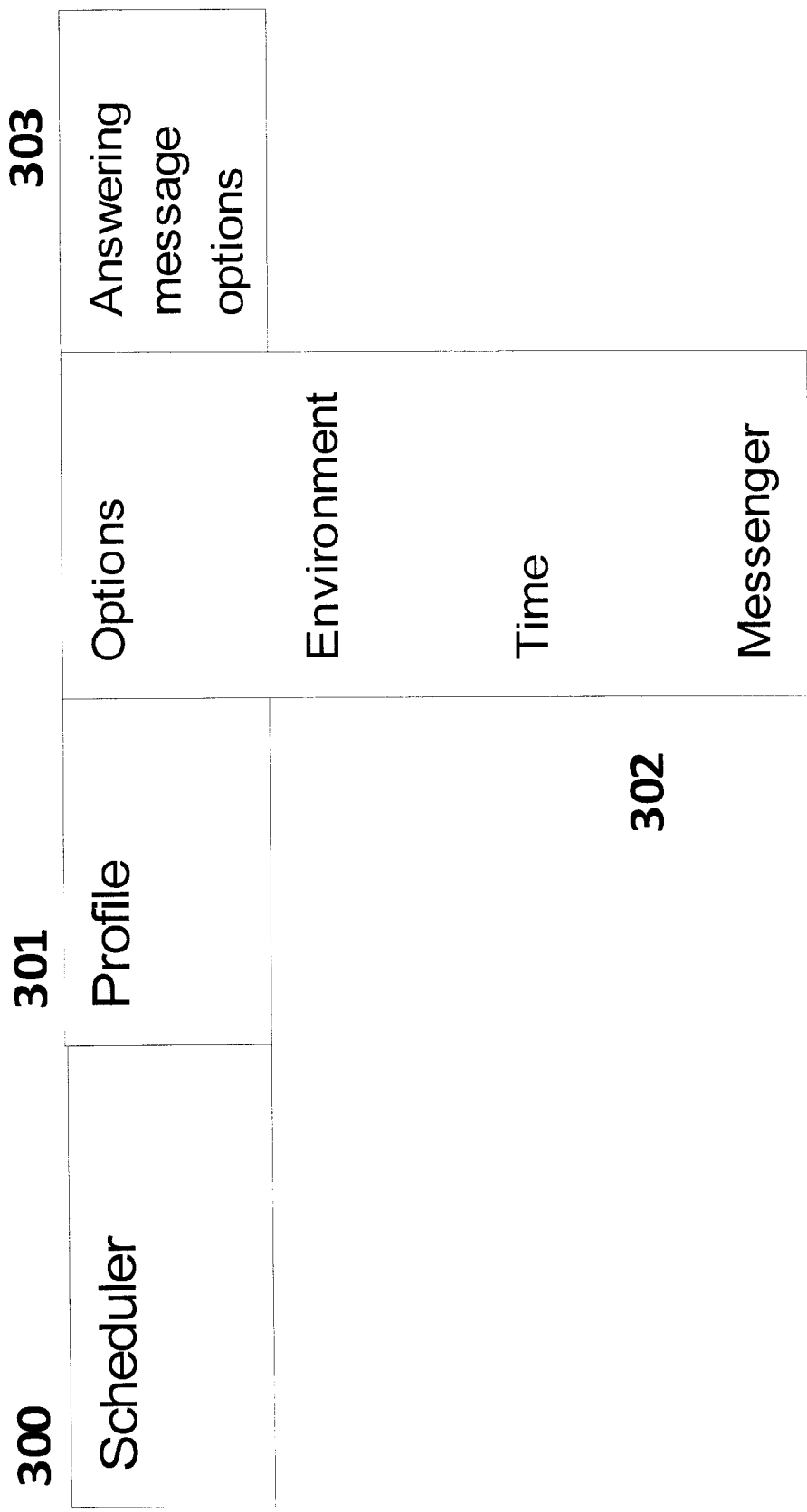
FIG. 4 illustrates an exemplary aspect of an exemplary embodiment of the operations control menu of the calendar of the system of the present invention

Exemplarily illustrated in FIG. 3, the calendar 101 provides the user with the ability to schedule an event such as a real-time collaborative activity in advance. The calendar 101 also provides the user with the ability to manage computer operation settings in conjunction with the scheduling of an event. Through an operations control menu 310 of the calendar 101 exemplarily illustrated in FIG. 4, the user is able to specify any computer operation allowed to operate during the event and prohibited from operating during the event. This operation control menu 310 allows a profile 301 to be developed by a user for a specific event entered into the scheduler 300 of the calendar 301. The profile 301 allows the user to provide specific operational settings, exemplarily represented in 302, with respect to all computer operations included in the profile 301 by the user. Optionally and exemplarily, with respect to internet or cellular telephony, answering machine settings 303 can also be specified through the operations control menu 310.

In an exemplary embodiment of the calendar 101 illustrated in FIG. 3, the ability to manage the computer operations center 107 through the calendar 101 is fully customizable to the needs of the user. The user has the option of disabling all operations occurring within the computer operation center 107. The user also has the option of only disabling one or more specific background processes. Management of displayed alerts and audio alerts are also accomplished in the same way. The calendar 101 centrally stores this user preference information for the controller 102 to centrally reference and implement in the course of controlling all operations that the computer operation center 107 attempts to initiate.

An exemplary embodiment of the calendar 101 includes flags that allow the user to specify computer operation settings with respect to individual programs or global operations. The specific flags may include many different types of functionality with respect to the management of computer operation settings, including, but not limited to, if an alert can be routed immediately, if an alert is suspended, if a suspended alert should appear at the end of the scheduled period, if a suspended alert is cancelled at the moment of suspension, if an alert is to be blocked, placed in the background, or allowed, and if a specific alert should be classified as an emergency or one that is routine.

The user management of global operation can also be accomplished by flags provided through the calendar 101 as well. For example, the user can specify whether to allow background processes during real-time collaborative activities. The user can also specify whether networking applications, such as instant messenger or Skype, are allowed to operate during real-time collaborative activities. The user can further specify a list of allowed alerts and a list of excluded alerts to exist during the event. In addition, the user can specify general action to be taken upon the initiation of a real-time collaborative activity even if the activity is not recorded in the scheduler portion of the calendar 101.

An exemplary functionality of the calendar 101 allows for a user to specify that only certain types of alerts should be allowed during an event. Exemplarily, if a user schedules a real-time collaborative activity in which the user is the administrator or the presenter and the system 100 is the facilitator of the real-time collaborative activity, the user can specify through flags that there should be no alerts of any kind during the real-time collaborative activity except for those that would be normally identified as emergency alerts. The user would have the ultimate discretion regarding what alert would ultimately be classified as an emergency alert.

When entering into a mode designed for a specific event, the calendar 101 may be enabled to attempt to anticipate potential emergencies and prevent them from occurring while the event is taking place. For example, if the calendar 101 realizes that an event is about to take place and the computer being used is not connected to a power source, the calendar 101 would alert the user to this prior to the initiation or beginning of the event.

Figure 2:
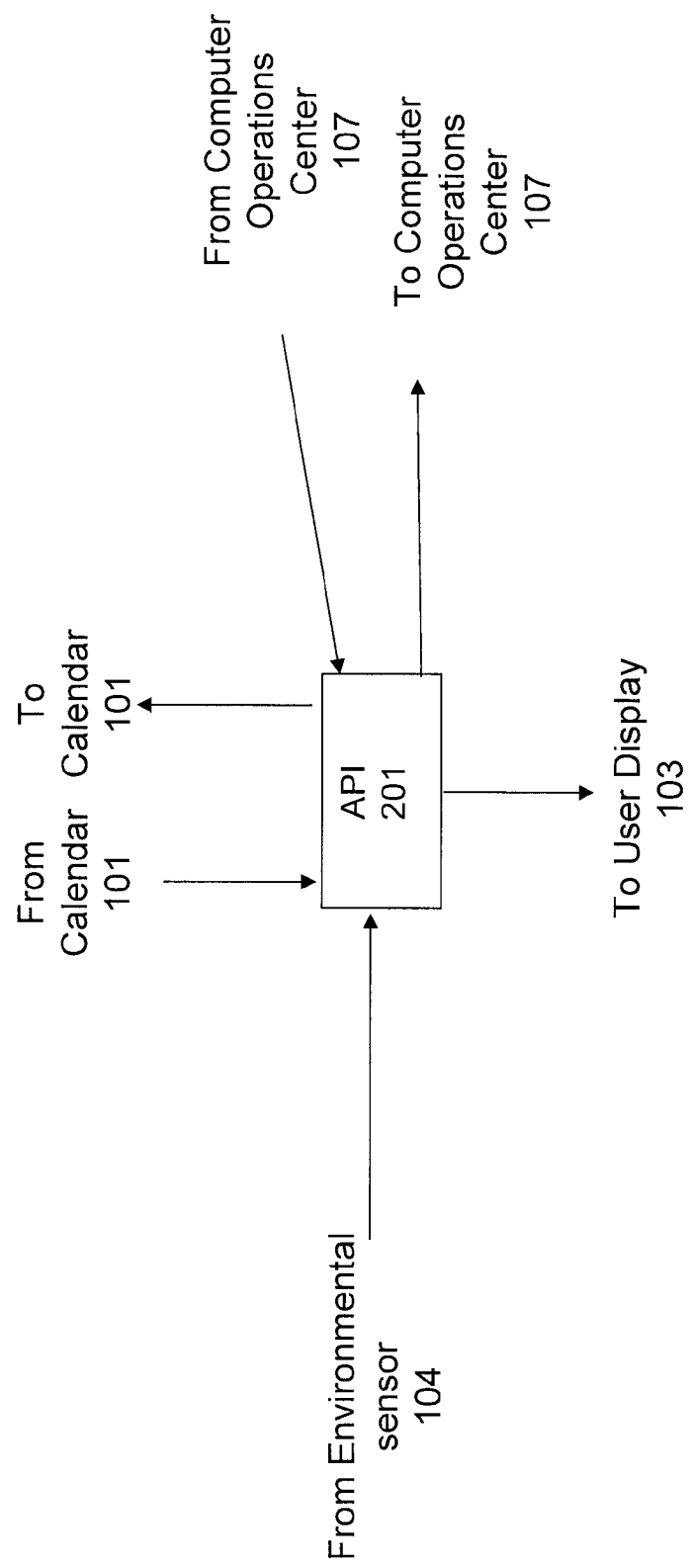
FIG. 2 illustrates an exemplary embodiment of the controller of the system of the present invention.

Exemplarily illustrated in FIG. 2, the controller 102 includes an Application Programming Interface (API) 201. The API 201 allows the calendar 101, according to user preferences, to indicate to the API 201 what actions to take with respect to the management of the computer operations center 107. The API 201 applies the user preferences communicated by the calendar 101 to manage the computer operations center 107 according to the user preferences. The API 201 will allow and disallow alerts to be displayed and will allow and disallow process initiation according to the user's preferences.

In another exemplary embodiment, the controller 102 also may be connected to an environmental sensor 104. The environmental sensor 104 detects an occurrence of an event and communicates the occurrence to the API 201. If the API 201 has not been previously notified of the event by the calendar 101, the API 201 communicates with the calendar 101 to determine whether a set of user preferences have been stored for implementation in case of a detection of an unscheduled event. If user preferences have been established regarding detected occurrences of unscheduled events, the controller 102 retrieves the specific user preferences and controls the computer operations during the unscheduled event according to those specific user preferences. The environmental sensor can be a number of different devices, including a biometrics scanner, a microphone, or a camera.

An exemplary aspect of the present invention is as follows. An application that is running at the same time as an event is occurring wants to either alert a user or initiate a process. However, in contrast from conventional methods of alert management, the application wanting to issue the alert or initiate the process must make a call to the API 201. The application can communicate information to the API 201 such as the level of an alert or a process, or how urgent an alert or a process might be. The code in the API 201 will decide from the communication with the calendar 101 if the alert or process can be routed immediately, suspended, or returned back to the application. When leaving a presentation mode, the API 201 informs the application that the presentation mode is exited so that alerts can be routed appropriately and the processes can be initiated.

In an alternative exemplary embodiment of the present invention, a calendar 101 can infer a flag automatically from the description of an event in a calendar 101. When the calendar 101 makes the determination that a description entered in the calendar 101 represents one of an event, the calendar 101 is able to make an appropriate call to the API 201 to instruct the API 201 how to handle certain alerts and processes that occur during an event.

Another exemplary aspect of the present invention includes a synchronizer 105 of a smart cellular phone 106. The synchronizer 105 exchanges information with the calendar 101. The synchronizer 105 is able to identify time slots in the calendar 101 during which computer operations are undesirable. The synchronizer 105 itself can then switch the smart cellular phone 106 from a ring mode to a vibrate mode automatically; and switch back from a vibrate mode to a ring mode once it is acceptable to do so. Alternatively, the synchronizer 105 will configure the phone 106 to accept calls directly into phone mail depending on a profile description of an incoming phone number.

To avoid disruptions caused by various computer processes occurring in the computer process center 107, applications such as backup software or Anti-virus software will query the API 201 for information regarding a user's calendar. This will enable these applications to schedule processes during open time slots when the user is not doing critical work or involved in an event.

A user has the ability to specify additional preferences in a calendar 101. For example, the user can set up a flag that will instruct the API 201 not to print instant messages if the user's laptop is connected to a projector. This allows a user to temporarily stop receiving messages when the computer is connected to a projector during an event. When the user disconnects the computer from the projector, the API 201 allows the messages to be displayed on a user display 103. Also, a calendar 101 can instruct the API 201 to provide a specific response to an instant messenger if an event is ongoing and instant messenger alerts are restricted during the event. The specific response can be either one that is generic and pre-stored in the calendar 101 or can be one created by the user and specified to the calendar 101.

In addition, some events will only require that the system 100 be connected to a projector temporarily. Also, some events will require that the system 100 be connected to a projector at varying times through the event. The user is able to specify these options in the calendar 101 in order for the API 201 to anticipate connections and disconnections to a projector.

The calendar 101 can also contain other information like answering machine greeting messages to be used when contacted by an internet telephone or through VoIP during an event. The calendar 101 is able to determine a contacting party and to provide specific information to be communicated to the contacting party. The calendar 101 can also have a flag designed to only allow calls from certain parties during the occurrence of an event.

Another exemplary embodiment of the present invention includes an event participant's ability, when connecting to a system 100 for participation in the event, rewind the live event and replay it up to the point where the event is live again. A backup 110 included in the system allows the participant to catch up with the event if the participant's connection to the event is interrupted. Thus, an interruption in information will not cause a participant to lose all of the information conveyed during the interruption due to the existence of the backup 110.

Figure 5:
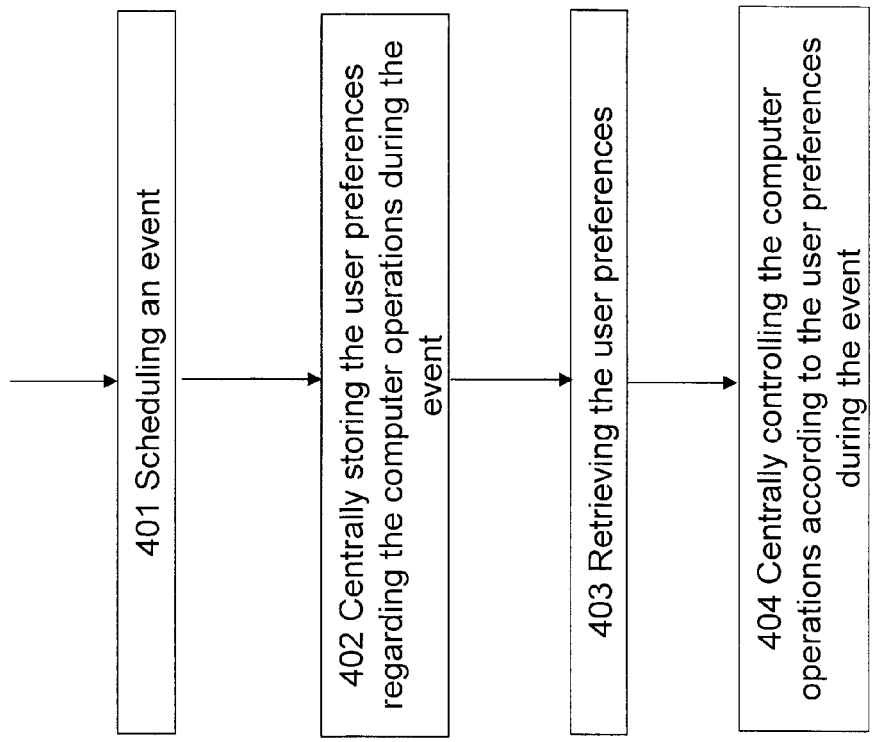
FIG. 5 illustrates an exemplary embodiment of a method of the present invention.

FIG. 5 illustrates an exemplary embodiment of a method 400 for managing computer operations according to stored user preferences. The method includes scheduling (401) an event, centrally storing (402) the user preferences regarding the computer operations during the event, retrieving (403) the user preferences, and centrally controlling (404) the computer operations according to the user preferences during the event.

Figure 6:
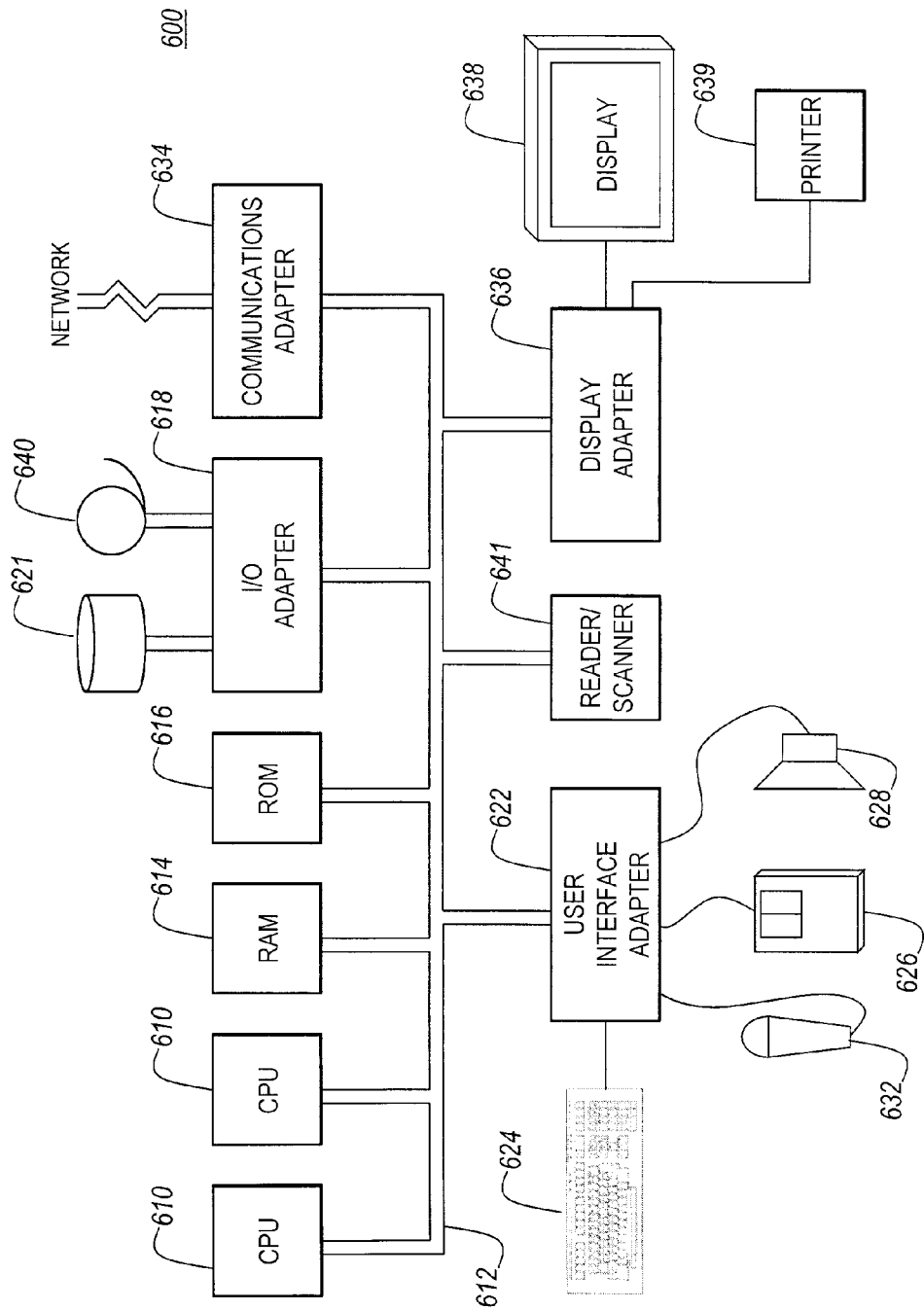
FIG. 6 illustrates a typical hardware configuration of an information handling/computer system for use with an exemplary embodiment of a system and method of the present invention.

FIG. 6 illustrates a typical hardware configuration of an information handling/computer system for use with the invention and which preferably has at least one processor or central processing unit (CPU) 610.

The CPUs 610 are interconnected via a system bus 612 to a random access memory (RAM) 614, read only memory (ROM) 616, input/output (I/O) adapter 618 (for connecting peripheral devices such as disk units 621 and tape drives 640 to the bus 612), user interface adapter 622 (for connecting a keyboard 624, mouse 626, speaker 628, microphone 632, and/or other user interface device to the bus 612), a communication adapter 634 for connecting an information handling system to a data processing network, the Internet, an Intranet, a personal area network (PAN), etc., reader/scanner 641, and a display adapter 636 for connecting the bus 612 to a display device 638 and/or printer 639.

In addition to the hardware/software environment described above, a different aspect of the invention includes a computer implemented method for performing the above-described method. As an example, this method may be implemented in the particular environment discussed above.

Such a method may be implemented, for example, by operating a computer, as embodied by a digital data processing apparatus, to execute a sequence of machine readable instructions. These instructions may reside in various types of signal bearing media.

This signal bearing media may include, for example, a RAM contained within the CPU 610, as represented by the fast access storage for example. Alternatively, the instructions may be contained in another signal bearing media, such as a signal bearing medium 700 in FIG. 7, directly or indirectly accessible by the CPU 610.

Whether contained in the signal bearing medium 700, the computer/CPU 610, or elsewhere, the instructions may be stored on a variety of machine readable data storage media, such as DASD storage (e.g., a conventional "hard drive" or a RAID array), magnetic tape, electronic read only memory (e.g., ROM, EPROM, or EEPROM), an optical storage device (e.g. CD ROM, WORM, DVD, digital optical tape, etc.), paper "punch" cards. In an illustrative embodiment of the invention, the machine readable instructions may comprise software object code, compiled from a language such as "C", etc.

Figure 7:
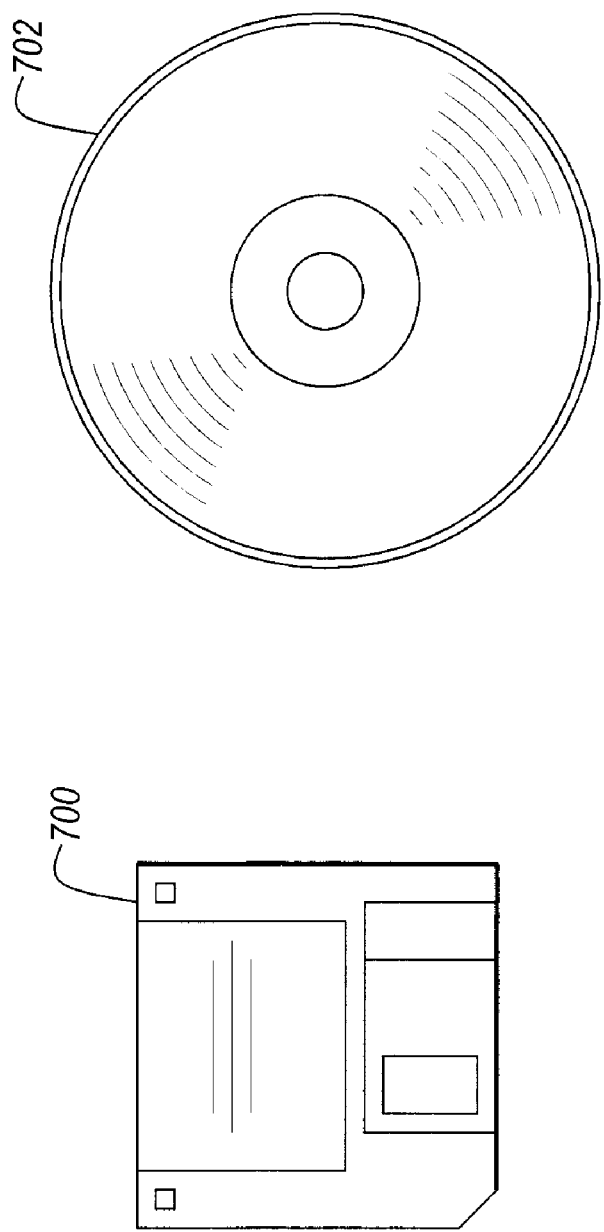
FIG. 7 illustrates a signal bearing medium and CD ROM for storing steps of a program for use with an exemplary embodiment of a system and method of the present invention.

FIG. 7 illustrates a signal bearing medium 700 (e.g., storage medium) and CD ROM 702 for storing steps of a program of a method according present invention.

In the description above, numerous specific details were set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code that embodies aspects of the present invention is typically maintained in permanent storage, such as a computer readable medium. In a client-server environment, such software programming code may be stored on a client or server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software.

Improvements and modifications can be made to the foregoing without departing from the scope of the present invention.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

What is claimed is:

1. A system for managing computer operations according to stored user preferences, comprising:
   a calendar module for scheduling an event and centrally storing said user preferences regarding said computer operations during said event, said user preferences specifying which of said computer operations are allowed to operate during said event and which of said computer operations are prohibited from operating during said event;
   a controller module for retrieving said user preferences centrally stored in said calendar module and centrally controlling said computer operations according to said user preferences during said event; and
   a backup module for recording said event,
   wherein said backup module is accessed by a participant of said event, said participant being disconnected from said event such that said backup module provides a portion of said event to said participant in which said participant was unable to participate due to being disconnected.

2. The system for managing computer operations according to claim 1, wherein said calendar module comprises a scheduler module for allowing a user to one of schedule said event in said calendar module and indicate to said calendar module that said event is occurring presently.

3. The system for managing computer operations according to claim 2, wherein said calendar module communicates to said user in order to prevent an emergency from occurring during said event.

4. The system for managing computer operations according to claim 1, further comprising:

an environmental sensor module for detecting an occurrence of said event and communicating said occurrence of said event to said controller module, wherein, if said calendar module did not notify said controller module of said occurrence of said event prior to a detection of said occurrence of said event and if said calendar module comprises stored user preferences applicable to an occurrence of an unscheduled event, said controller module controls said computer operations according to said user preferences applicable to said occurrence of said unscheduled event.

5. The system for managing computer operations according to claim 1, wherein said calendar module includes stored information that is communicated to the controller module to determine whether one of the computer operations is an emergency.

6. The system for managing computer operations according to claim 1, further comprising:

a user display module for use in facilitating said event, wherein said controller module controls said computer operations such that said user preferences determine whether said computer operations use said user display module during said event.

7. The system for managing computer operations according to claim 1, further comprising:

a synchronizer module for communicating with said calendar module in order to identify a time period in which a distraction is unwanted, wherein said synchronizer module communicates with a device outside of the system to remove said distraction during said time period.

8. A method for managing computer operations according to stored user preferences, comprising:

scheduling an event;

centrally storing said user preferences regarding computer operations during said event, said user preferences specifying which of said computer operations are allowed to operate during said event and which of said computer operations are prohibited from operating during said event;

retrieving said user preferences;

centrally controlling said computer operations according to said user preferences during said event; and recording said event such that said event can be accessed by a participant of said event to provide said participant with a portion of said event in which said participant was unable to participate due to being disconnected from said event, wherein a calendar performs said scheduling of said event and said centrally storing of said user preferences, wherein a controller performs said retrieving of said user preferences and said centrally controlling of said computer operations, and wherein said calendar comprises a scheduler that allows a user to one of schedule said event in said calendar and indicate to said calendar that said event is occurring presently.

9. The method for managing computer operations according to claim 8, further comprising:

detecting an occurrence of said event by using an environmental sensor;

communicating said occurrence of said event from said environmental sensor to said controller; and if said calendar did not notify said controller of said occurrence of said event prior to said detecting of said occurrence and if said calendar comprises stored user preferences applicable to an occurrence of an unscheduled event, using said controller to control said computer operations according to said user preferences applicable to said occurrence of said unscheduled event.

10. The method for managing computer operations according to claim 9, further comprising:

using the controller to determine whether one of the computer operations is an emergency.

11. The method for managing computer operations according to claim 8, further comprising:

using a user display to facilitate said event; and using said user preferences to determine whether said computer operations use said user display during said event.

12. The method for managing computer operations according to claim 8, further comprising:

communicating to said user in order to prevent an emergency from occurring during said event.

13. The method for managing computer operations according to claim 8, further comprising:

synchronizing with said calendar in order to identify a time period in which a distraction is unwanted such that said distraction is removed during said time period.

14. A programmable storage medium tangibly embodying a program of machine-readable instructions executable by a digital processing apparatus to manage computer operations according to user preferences, comprising:

a calendar in which a user schedules an event and stores said user preferences regarding said computer operations during said event, said user preferences specifying which of said computer operations are allowed to operate during said event and which of said computer operations are prohibited from operating during said event;

a controller for retrieving said user preferences centrally stored in said calendar and centrally controlling said computer operations according to said user preferences during said event; and a recorder that records said event, wherein said recorder is accessed by a participant of said event, said participant being disconnected from said event such that said recorder provides a portion of said event to said participant in which said participant was unable to participate due to being disconnected.

15. The programmable storage medium according to claim 14, wherein said calendar comprises a scheduler that allows said user to one of schedule said event in said calendar and indicate to said calendar that said event is occurring presently.

16. The programmable storage medium according to claim 14, further comprising:

an environmental sensor that detects an occurrence of said event and communicates said occurrence of said event to said controller, wherein, if said calendar did not notify said controller of said occurrence of said event prior to a detection of said occurrence of said event and if said calendar comprises stored user preferences applicable to an occurrence of an unscheduled event, said controller controls said computer operations according to said user preferences applicable to said occurrence of said unscheduled event.

* * * * *